US012515363B2

(12) United States Patent
Ahn et al.

(10) Patent No.: US 12,515,363 B2
(45) Date of Patent: Jan. 6, 2026

(54) RAZOR ASSEMBLY, RAZOR HANDLE AND RAZOR CARTRIDGE

(71) Applicant: DORCO CO., LTD., Seoul (KR)

(72) Inventors: Hyo Sun Ahn, Seoul (KR); Sung Hee Son, Seoul (KR)

(73) Assignee: DORCO CO., LTD., Seoul (KR)

( * ) Notice: Subject to any disclaimer, the term of this patent is extended or adjusted under 35 U.S.C. 154(b) by 416 days.

(21) Appl. No.: 18/058,631

(22) Filed: Nov. 23, 2022

(65) Prior Publication Data

US 2023/0166420 A1 Jun. 1, 2023

(30) Foreign Application Priority Data

Nov. 29, 2021 (KR) ........................ 10-2021-0167664

(51) Int. Cl.

*B26B 21/52* (2006.01)
*B26B 21/22* (2006.01)
*B26B 21/40* (2006.01)
*B26B 21/44* (2006.01)
*B26B 21/48* (2006.01)

(52) U.S. Cl.

CPC .......... *B26B 21/521* (2013.01); *B26B 21/222* (2013.01); *B26B 21/4012* (2013.01); *B26B 21/225* (2013.01); *B26B 21/4031* (2013.01); *B26B 21/405* (2013.01); *B26B 21/443* (2013.01); *B26B 21/446* (2013.01); *B26B 21/48* (2013.01)

(58) Field of Classification Search

CPC ..... B26B 21/165; B26B 21/22; B26B 21/222; B26B 21/225; B26B 21/227; B26B 21/52; B26B 21/521; B26B 21/4012

See application file for complete search history.

(56) References Cited

U.S. PATENT DOCUMENTS

| | | | | |
|---|---|---|---|---|
| 2,769,233 A * | 11/1956 | Duke | ...................... | B26B 21/34 30/34.2 |
| 6,385,850 B1 | 5/2002 | Coulthard, Jr. | | |
| 11,220,014 B2 * | 1/2022 | Kim | ........................ | B26B 21/56 |
| 2005/0166404 A1 * | 8/2005 | Colthurst | ................ | B26B 21/28 30/50 |

(Continued)

FOREIGN PATENT DOCUMENTS

| | | |
|---|---|---|
| DE | 8909321 U1 | 12/1990 |
| EP | 1304196 A1 | 4/2003 |

(Continued)

OTHER PUBLICATIONS

European Search Report of the corresponding European Application No. 22210003.4 dated May 2, 2023.

*Primary Examiner* — Evan H MacFarlane

(74) *Attorney, Agent, or Firm* — Knobbe, Martens, Olson & Bear, LLP

(57) ABSTRACT

A razor assembly includes a razor cartridge including a plurality of blades including cutting edges, and a blade housing accommodating the plurality of blades in a longitudinal direction. The razor assembly also includes a handle coupling with the razor cartridge, and including a head, an interposed element provided at a first side of the head, and a grip extended from a second side of the head. The interposed element is accommodated inside the razor cartridge and interposed between the plurality of blades.

18 Claims, 10 Drawing Sheets

(56) References Cited

U.S. PATENT DOCUMENTS

| | | | | |
|---|---|---|---|---|
| 2010/0077617 | A1* | 4/2010 | Peterson | B26B 21/565<br>30/526 |
| 2019/0299456 | A1* | 10/2019 | Patel | B26B 21/225 |
| 2019/0375122 | A1* | 12/2019 | Appiah | B26B 21/227 |

FOREIGN PATENT DOCUMENTS

| | | | | |
|---|---|---|---|---|
| KR | 10-2013-0125538 | A | 11/2013 | |
| KR | 10-2019-0103216 | A | 9/2019 | |
| WO | WO-9525617 | A1 * | 9/1995 | B26B 21/22 |
| WO | 2020217104 | A1 | 10/2020 | |

* cited by examiner

RAZOR ASSEMBLY, RAZOR HANDLE AND RAZOR CARTRIDGE

CROSS REFERENCE TO RELATED APPLICATION

This application claims the benefit of Korean Patent Application No. 10-2021-0167664 filed on Nov. 29, 2021, the contents of which are all hereby incorporated by reference herein in their entirety.

BACKGROUND OF THE INVENTION

Field of the Invention

The disclosure relates to a razor assembly, a razor handle, and a razor cartridge, and more particularly to a razor assembly, a razor handle, and a razor cartridge, by which a shaving plane is improved.

Description of the Related Art

A razor assembly, known as a wet razor, includes a razor cartridge and a razor handle. The razor cartridge includes a plurality of blades, thereby forming a shaving plane. The razor cartridge is detachably coupled to the razor handle, and thus replaceable by a user as necessary.

The shaving quality of the razor is affected by various factors such as the arrangement, shape, thickness, etc. of the blades. Therefore, the razor is being researched and developed to have an improved structure that causes fewer wounds, cuts, etc. and gives a user a comfort of use while providing excellent shaving performance to cope with various user environments. However, a conventionally proposed razor has problems in that the size increases or the structure becomes complicated to improve the performance, and has limitations in providing the improved performance within a limited size.

Documents of Related Art

Korean Patent Publication No. 2013-0125538A (Nov. 19, 2013)

SUMMARY OF THE INVENTION

An aspect of the disclosure is to provide a razor assembly, a razor handle, and a razor cartridge, which can improve shaving performance to cope with various environments and give a comfort of use to a user while providing a compact structure.

According to an embodiment of the disclosure, there is provided a razor assembly including: a razor cartridge including a plurality of blades including cutting edges, and a blade housing accommodating the plurality of blades in a longitudinal direction; and a handle coupling with the razor cartridge, and including a head, an interposed element provided at a first side of the head, and a grip extended from a second side of the head, the interposed element being accommodated inside the razor cartridge and interposed between the plurality of blades.

According to an embodiment of the disclosure, there is provided a razor handle including: a head forming a portion to which a razor cartridge is coupled; an interposed element provided at a first side of the head, inserted in the razor cartridge when coupling with the razor cartridge, and interposed between the plurality of blades; and a grip extended from a second side of the head.

According to an embodiment of the disclosure, there is provided a razor cartridge including: a blade housing; and a plurality of blades including cutting edges and longitudinally arranged in the blade housing, the blade housing includes a shaving plane formed with a first area in which some among the plurality of blades are arranged, a second area in which others among the plurality of blades are arranged, and an opening formed between the first area and the second area and extended in a longitudinal direction to accommodate an interposed element provided in a handle when coupling with the handle.

DETAILED DESCRIPTION OF THE INVENTION

Hereinafter, a razor assembly, a razor handle, and a razor cartridge according to an embodiment of the disclosure will be described in detail with reference to the accompanying drawings. In the following description, a positional relationship between elements is based on the accompanying drawings in principle, but is separately defined as necessary.

In the accompanying drawings, a structure according to the disclosure may be simplified for convenience of description, or may be exaggerated as necessary. However, the disclosure is not limited to such a simplified or exaggerated structure, but may be embodied with various additional, changed or omitted elements.

Further, in terms of describing elements in the following embodiments, an element 'including' or 'having' sub-elements is construed as an element that may include another sub-element other than the described sub-elements.

Figure 1:
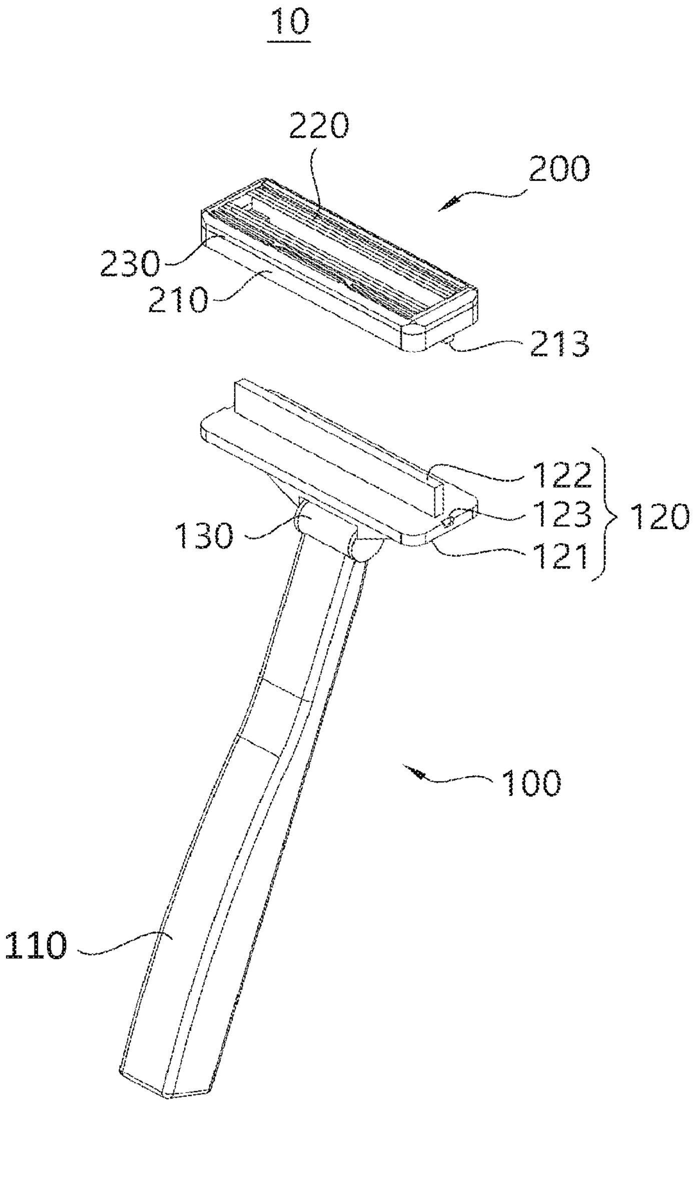
FIG. 1 is an exploded perspective view of a razor assembly according to an embodiment of the disclosure.

FIG. 1 is an exploded perspective view of a razor assembly according to an embodiment of the disclosure. As shown in FIG. 1, a razor assembly 10 according to this embodiment includes a razor cartridge 200 provided with a plurality of blades 220, and a handle 100 to which the razor cartridge 200 is pivotably coupled.

The razor handle 100 includes a grip 110 forming a body, and a head 120 to which the razor cartridge 200 is coupled.

The grip 110 refers to a portion to be gripped by a user, which is extended to have a predetermined length from a second side of the head 120 and forms the body of the razor handle 100.

The head 120 is provided at one end of the grip 110, so that the razor cartridge 200 can be selectively coupled to the head 120. The head 120 includes a body portion 121, a head coupling portion 123 to couple with the cartridge 200, and an interposed element 122 shaped protruding from the body portion 121.

The body portion 121 of the head 120 forms the body of the head 120. In FIG. 1, the body portion 121 is shaped like a stage, on which the razor cartridge 200 is seated, but not limited thereto. Alternatively, the body portion 121 may have various shapes.

Further, the head coupling portion 123 refers to an element for coupling with the razor cartridge 200, and is provided at the first side of the body portion 121. The head coupling portion 123 couples with a cartridge coupling portion 213, and various coupling structures such as a hook structure, a fitting structure, etc. may be used for the coupling between the head coupling portion 123 and the cartridge coupling portion 213. Although it is not illustrated in the accompanying drawings, the head 120 may further include a handling portion for allowing a user to release the coupling between the head coupling portion 123 and the cartridge coupling portion 213.

The interposed element 122 is provided as a member protruding from the first side of the head 120, and inserted in the razor cartridge 200 when coupling with the razor cartridge. Regarding the interposed element 122, more detailed descriptions will be made below with reference to separate drawings.

As shown in FIG. 1, the head 120 may be provided at one end of the grip 110 through a connector 130. For example, a pivoting shaft may be provided at the inner sides of the connector 130 so that the head 120 can pivot forward and backward. Therefore, the head 120 and the interposed element 122 are pivotably provided at the first side of the handle 100, having a pivotable structure with respect to the grip 110. Further, an elastic portion may be additionally provided inside the connector 130 to support the head 120 or provide restoring force against the pivoting operation of the head 120. Thus, the head 120 and the razor cartridge 200 coupled to the head 120 are elastically supported by the connector 130, and the restoring force is provided to return the head 120 to its original position when the head 120 is pivoted. With the foregoing coupling structure of the head 120, the razor cartridge 200 can perform a shaving operation while being pivoted along the surface of skin as pushed by a user during shaving. However, the disclosure is not limited to this structure, and a magnetic material or other structures may be used to provide the restoring force against the pivoting operation of the head 120.

Meanwhile, the razor cartridge 200 includes the plurality of blades 220, a blade housing 210, and a housing cover 230 and performs the shaving operation while being in contact with a user's skin surface.

The blade 220 is made of steel or the like rigid material to cut body hair as exposed to a shaving plane. Each blade 220 is disposed inside the razor cartridge 200 in a longitudinal direction corresponding to the lengthwise direction of the blade 220. The plurality of blades 220 are sequentially arranged inside the razor cartridge in forward and backward directions (hereinafter, a portion that comes into contact with skin first at a razor stroke will be referred to as a frontward portion, and a portion that comes into contact with the skin later will be referred to as a backward portion), thereby forming the shaving plane.

Figure 3:
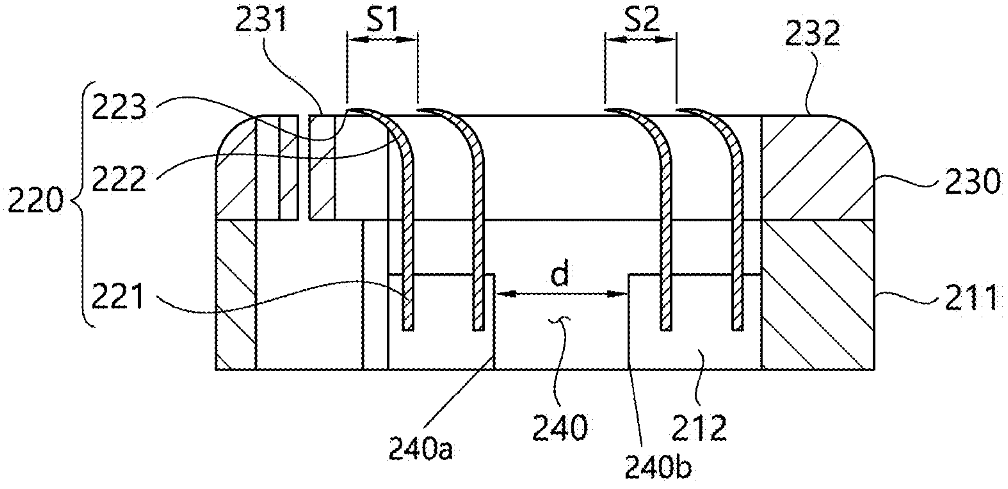
FIG. 3 is a cross-sectional view showing the razor cartridge in FIG. 1.

The blade 220 includes a base portion 221, a curved portion 222 and a cutting edge 223 (see FIG. 3). The base portion 221 is embedded in a supporting portion 212 of the blade housing 210 (to be described later) and supported on the blade housing 210. The curved portion 222 is extended from the base portion 221 toward a shaving direction while forming an obtuse angle. The shaving direction refers to a stroke direction of the razor cartridge 200 during shaving. The cutting edge 223 is formed at the end of the curved portion 222, and exposed to the shaving plane of the razor cartridge 200, thereby carrying out a cutting operation.

The blade housing 210 refers to an element for forming the body of the razor cartridge 200 and supporting the plurality of blades 220, and includes a housing frame 211, the supporting portion 212, and the cartridge coupling portion 213. For example, the housing frame 211 has a frame structure for forming the outer appearance of the razor cartridge 200, and is internally formed with an opening through which body hair cut by the blade 220 is discharged. The supporting portion 212 refers to an element for supporting the plurality of blades 220, is formed at longitudinal lower opposite portions of the housing frame 211, so that the plurality of blades 220 can be accommodated inside the razor cartridge 200 in the longitudinal direction. The supporting portion 212 has a structure in which the base portion 221 of each blade is embedded and supported, and may employ various guide structures such as a slit, a groove, a projection, etc. The cartridge coupling portion 213 couples with the head coupling portion 123 to thereby fasten the cartridge 200 to the head 120, and may employ various coupling structures corresponding to the head coupling portion 123.

The housing cover 230 refers to an element for preventing the plurality of blades 220 supported in the blade housing 210 from being removed. The housing cover 230 is installed at an upper side of the blade housing 210, and covers at least a partial area of the blade housing 210. For example, the housing cover 230 covers the area including the longitudinal opposite sides of the blade housing 210, and the plurality of blades 220 may be fitted between the supporting portion 212 of the blade housing 210 and the housing cover 230.

The shape of the housing cover 230 may be varied depending on the shape of the blade housing 210. For example, the housing cover 230 may be shaped like a quadrangular frame, a central portion of which is opened, to fully cover the outer circumference of the blade housing 10, or may be shaped like a clip to cover the longitudinal opposite end portions of the blade housing 210.

Although it is not additionally illustrated in FIG. 1, the razor cartridge 200 may include a guard member 231 formed in the front of the shaving plane, and a cap 232 and a lubrication band 233 in the back of the shaving plane.

Figure 2:
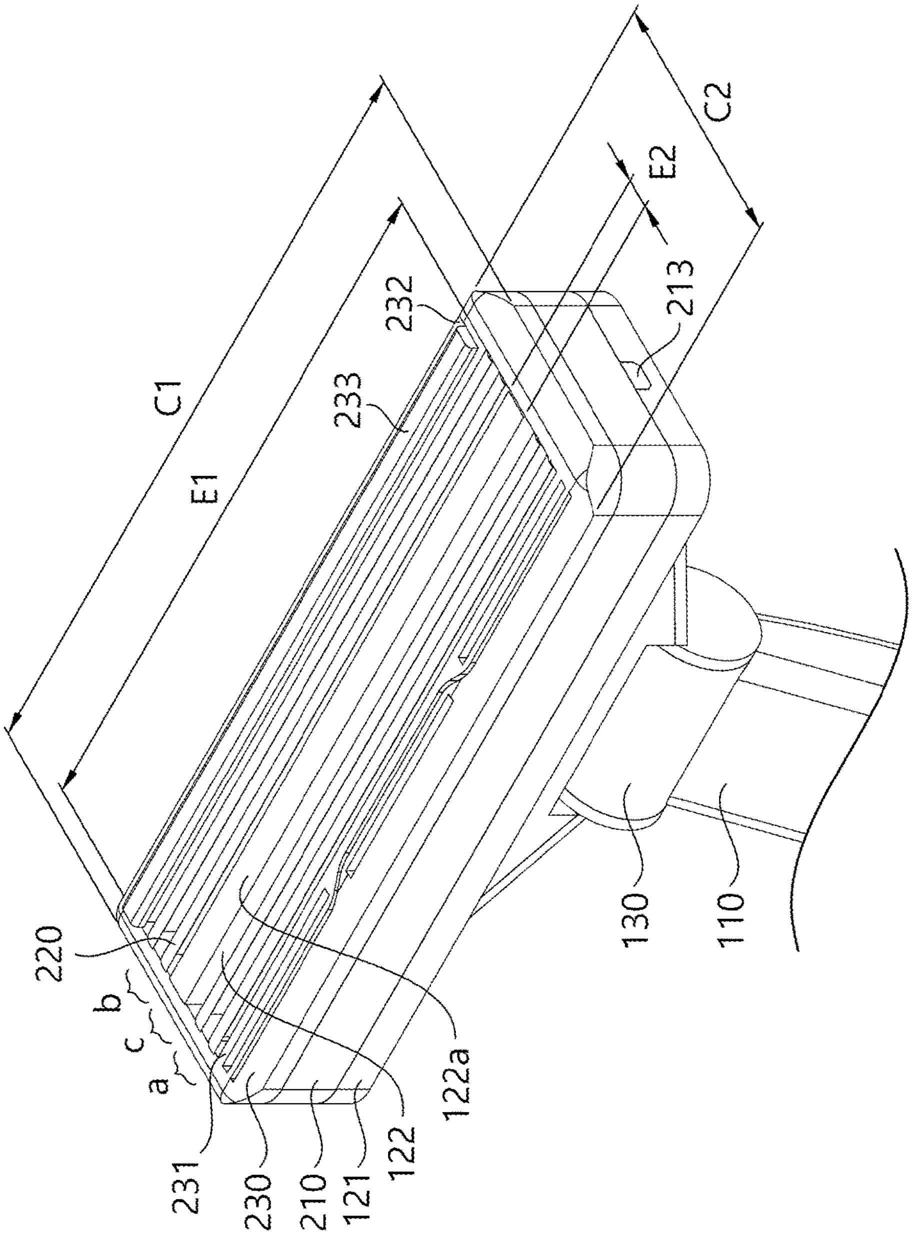
FIG. 2 is a perspective view showing a structure of a razor cartridge coupled to a handle in FIG. 1.

FIG. 2 is a perspective view showing a structure of the razor cartridge 200 coupled to the handle 100 in FIG. 1.

The razor cartridge 200 includes the plurality of blades 220 sequentially arranged in the forward and backward directions. Further, when the razor cartridge 200 is mounted to the razor handle 100, the interposed element 122 of the razor handle 100 is accommodated in the razor cartridge 200 and interposed between the plurality of blades 220. Therefore, in the shaving plane formed on the top surface of the razor cartridge 200, the blades are not continuously arranged in the forward and backward directions, but discontinuously arranged as divided by the interposed element 122.

Specifically, as shown in FIG. 2, the blade housing 210 is internally formed with a first area a in which some among the plurality of blades 220 are arranged, and a second area b in which the others among the plurality of blades 220 are arranged. Further, a third area c is formed between the first area a and the second area b, and allows the interposed element 122 to be inserted and arranged. Thus, the first area a and the second area b corresponding to the cutting areas are spaced apart from each other by the interposed element 122.

As shown in FIG. 2, the interposed element 122 is formed to have a height equal to or higher than the height of the cutting edge 223 of the plurality of blades 220 while being accommodated in the razor cartridge 200. Therefore, the end of the interposed element 122 is exposed together with the plurality of blades 220 on the shaving plane defined by a front guard member 231 and a rear cap 232 of the razor cartridge 200. The upper end of the interposed element 122 forms a skin contact portion 122*a* corresponding to a non-cutting area. Therefore, when a user gets a shaving stroke, the skin surface comes into contact with the blades 220 corresponding to the first area a to undergo cutting, comes into contact with the skin contact portion of the interposed element 122 corresponding to the third area, and then comes into contact again with the blades 220 corresponding to the second area b to undergo cutting.

FIG. 2 shows an example that the upper end of the interposed element 122 is flat but not limited thereto. Alternatively, the upper end of the interposed element 122 may have various shapes such as a curved shape, a blade shape having a noncutting edge, etc. Further, the skin contact portion 122*a* of the interposed element 122 may be coated with rubber or synthetic resin to cause tension to the surface of skin or improve a comfort of use when being in contact with the skin.

If only the plurality of blades are successively arranged on the shaving plane like those of a conventional razor, the plurality of blades increases pressure while continuously passing through the same position on the skin surface, thereby cause a user to experience discomfort. On the other hand, when the noncutting area (i.e., the third area c) formed by the interposed element 122 according to this embodiment is disposed between the cutting areas (i.e., the first and second areas a and b), the pressure applied to the skin surface by the blades 220 is temporarily released or reduced while passing through the noncutting area c, thereby having an advantage of giving a good feeling of use to a user.

Further, as the skin contact portion 122*a* of the interposed element 122 forming the noncutting area c between the cutting areas comes into contact with skin, the skin is stretched again in the stroke direction and improved in the contact during shaving, thereby reducing wounds, cuts, etc. and improving shaving performance.

Further, the cutting areas of the shaving plane are spaced apart by the interposed element 122, and it is therefore improved to cope with various angles of the skin surface while passing through the interposed element 122 even when curved skin is shaved, thereby enhancing shaving performance for various and complex shaving surfaces.

To realize the shaving plane with the interposed element 122, the razor cartridge 200 and the interposed element 122 may be formed as a single body. However, in this case, there are disadvantages in that the structure and the manufacturing process of the consumable razor cartridge 200 are complicated and thus costs increase. Further, the cut body hair between the blade 220 and the interposed element 122 is not likely to be discharged properly. On the other hand, the interposed element 122 according to an embodiment is provided in the razor handle 100 and exposed to the shaving plane when coupled to the razor cartridge 200, so that the structure of the cartridge 200 can be simplified to thereby reduce costs, and the cut body hair can be discharged through the opening, which is formed when the razor cartridge 200 is removed, to thereby have an advantage of easy cleaning.

Below, the structure of the razor cartridge 200 and the interposed element 122 according to an embodiment will be described in more detail with reference to FIGS. 3 and 4. FIG. 3 is a cross-sectional view showing the cartridge 200 of the razor 10 in FIG. 1, and FIG. 4 is a cross-sectional view showing the cartridge 200 of the razor 10 coupled to the handle 100 in FIG. 1.

Figure 4:
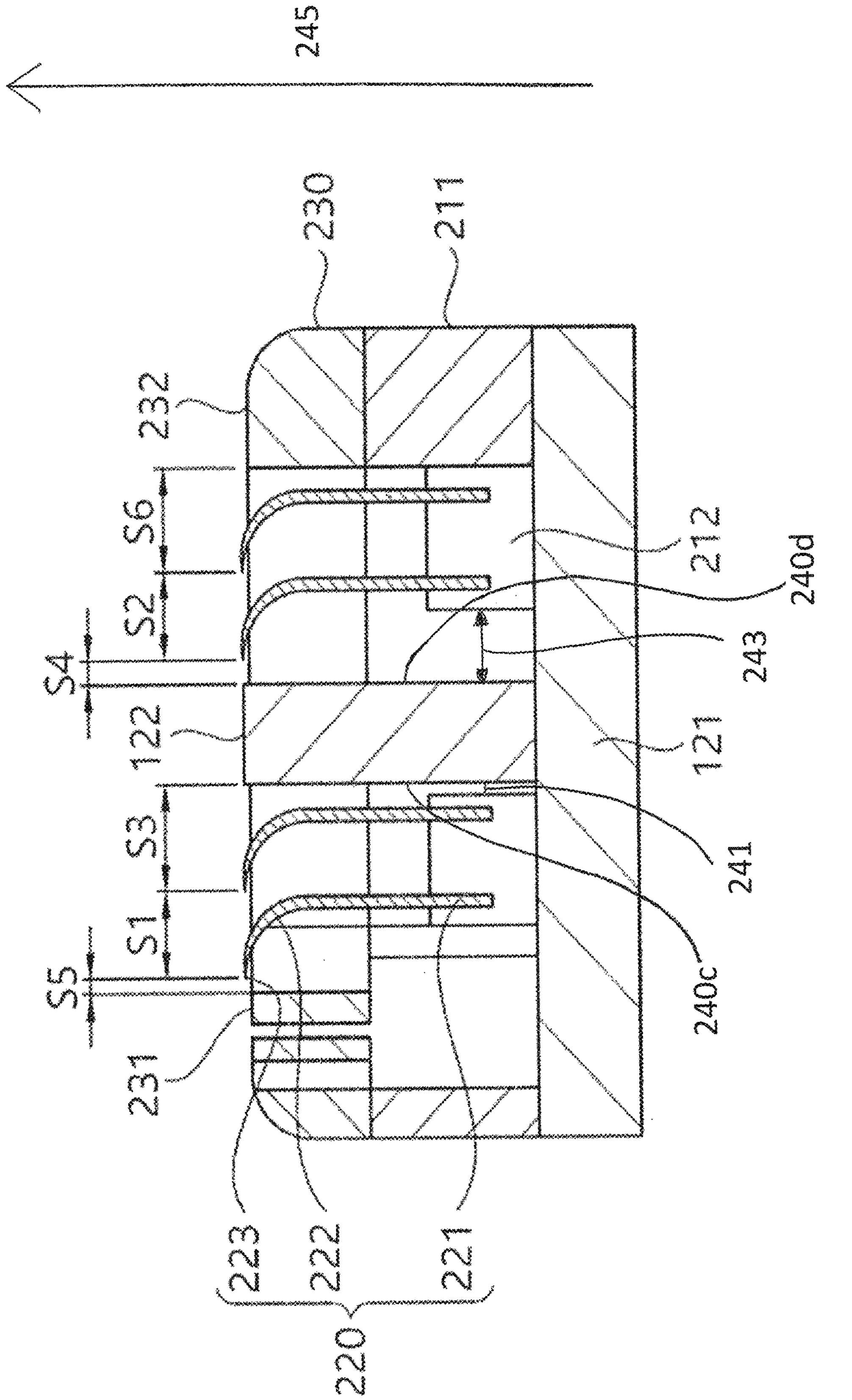
FIG. 4 is a cross-sectional view showing the razor cartridge coupled to the handle in FIG. 1.

As shown in FIGS. 3 and 4, the blades 200 of the razor cartridge 200 are supported in the supporting portion 212 of the blade housing 210, and the cutting edge 223 of each blade 220 is exposed to the shaving plane. At least one blade 220 is provided in the first area a and the second area b of the blade housing 210. FIG. 2 shows that each of the first and second areas is provided with two blades, but not limited thereto. Alternatively, each area may include one blade or more than two blades.

Further, the third area c of the blade housing 210 refers to a space in which the interposed element 122 is accommodated, and forms the opening 240 extended in the longitudinal direction when not coupled to the razor handle 100. The opening 240 may be designed to have a length in the longitudinal direction and a width in the transverse direction by taking the shape of the interposed element 122 into account.

Specifically, the longitudinal length of the opening 240 formed in the blade housing 210 may correspond to the longitudinal length of the interposed element 122 or may be slightly longer than the longitudinal length of the interposed element 122 for easy insertion. In this case, the interposed element 122 may be designed to have a length correspond to the longitudinal length of each blade 220, or may be shorter than the longitudinal length of the blade 220 in consideration of the length of the blade 220 to be embedded in the supporting portion 212.

Further, the opening 240 provided in the blade housing 210 is designed to have a width in the forward and backward directions in consideration of the transverse width of the interposed element 122, and a span between the interposed element 122 and the adjacent blade 220.

In this case, taking a proper distance of the noncutting area into account to improve the shaving performance, the forward and backward width d of the opening 240 may be more than twice the span S1 or S2 between a pair of adjacent blades (e.g., a pair of blades in the first area a or a pair of blades in the second area b). Here, the span refers to a distance between the edges of adjacent blades forming a pair.

Further, as shown in FIG. 4, in the state that the interposed element 122 is accommodated in the razor cartridge 200, a front span S3 of the interposed element 122 may be designed to be longer than a rear span S4 of the interposed element 122. Here, the front span S3 refers to a distance between the cutting edge of the frontward blade 220 closest to the interposed element and the front edge of the interposed element, and the rear span S4 refers to a distance between the cutting edge of the backward blade 220 closest to the interposed element and the rear edge of the interposed element.

Specifically, according to this embodiment, the razor cartridge 200 may have a longitudinal length C1 ranging from 39 to 57 mm, and a forward and backward length C2 ranging from 15 to 21 mm. Further, the interposed element 122 may have a longitudinal length E1 ranging from 30 to 37 mm, and a transverse length E2 ranging from 1.8 to 3.6 mm. In this case, the opening of the blade housing 210 may have a longitudinal length ranging from 30 to 37 mm, and the forward and backward length d ranging from 5 to 9 mm.

Further, as shown in FIG. 4, in the state that the interposed element 122 is accommodated in the razor cartridge 200, a front span S3 of the interposed element 122 may be designed to be longer than a rear span S4 of the interposed element 122. Here, the front span S3 refers to a distance between the cutting edge of the frontward blade 220 closest to the interposed element and the front edge of the interposed element, and the rear span S4 refers to a distance between the cutting edge of the backward blade 220 closest to the interposed element and the rear edge of the interposed element. Referring to FIG. 3 and FIG. 4, the opening 240 includes a first opening surface 240*a* and a second opening surface 240*b* that are arranged in a transverse direction perpendicular to the longitudinal direction. The opening 240 has a transverse width or a width (d) between the first opening surface 240*a* and the second opening surface 240*b*. The transverse width (d) of the opening 240 is greater than that of the interposed element 122 such that a first gap 241 is formed between the first opening surface 240*a* and a front edge portion 240*c* of the interposed element, and a second gap 243 is formed between the second opening surface 240*b* and a rear edge portion 240*d* of the interposed element opposing the front edge portion 240*c*. The first gap 241 does not overlap any portion of the at least one first blade in a third direction 245 perpendicular to both the longitudinal direction and the transverse direction. At least a portion of the second gap 243 does not overlap any portion of the at least one second blade in the third direction.

However, such numerical values based on the design of the razor cartridge 200 and the interposed element 122 are merely examples, and may be variously modified according to the use and design of the razor assembly.

Referring back to FIGS. 1 and 2, the foregoing razor cartridge 200 is mounted to the razor handle 100 in such a way that the cartridge coupling portion 213 is locked to the head coupling portion 123 of the head 120, so that the plurality of cutting areas a and b with the blades 220 can be spaced apart from each other by the interposed element 122. Further, the razor cartridge 200 and the interposed element 122 are pivoted as a single body with respect to a single pivoting shaft by the pivoting operation of the head 120, thereby achieving various operations to cope with various shaving environments.

Although an embodiment of the disclosure has been described above with reference to FIGS. 1 to 4, the description is not limited to the disclosed features but various changes can be made by modifying detailed features or reflecting additional features.

Below, an alternative embodiment in which some features are modified or added as compared to those of the foregoing embodiment will be described by way of example with reference to FIGS. 5 to 10. However, the same reference numerals refer to the same or similar elements to those of the foregoing embodiment, and detailed descriptions thereof will be omitted to avoid redundancy.

Figure 5:
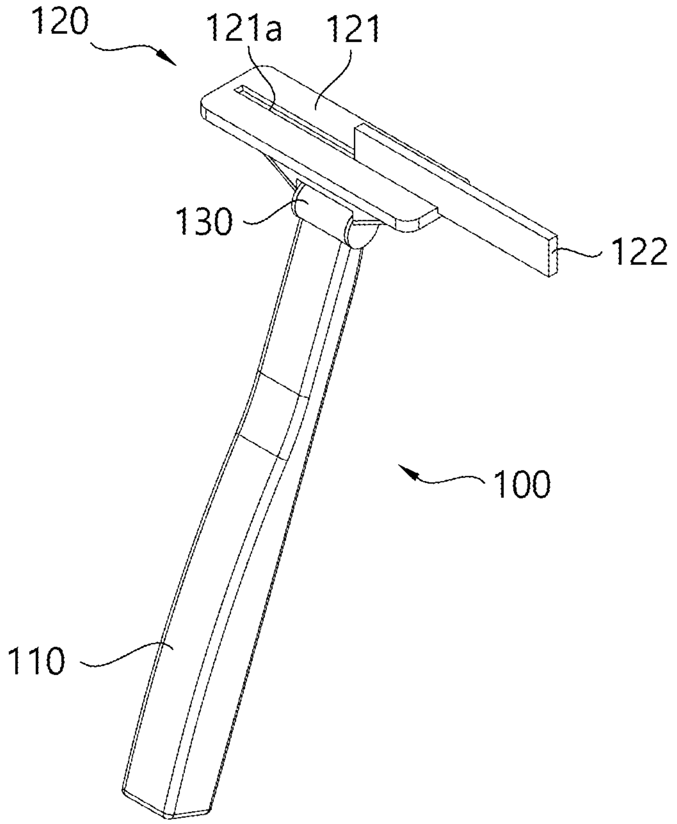
FIG. 5 is a perspective view of a handle with a replaceable interposed element according to an embodiment of the disclosure.

FIG. 5 is a perspective view of a handle 100 with a replaceable interposed element 122 according to an embodiment of the disclosure. The razor cartridge is consumable, and therefore selectively mounted to the razor handle and then replaced as a period of use expires and performance is lowered. Like this, the interposed element, together with the razor cartridge, is also exposed to the shaving plane during shaving, and therefore may need to be replaced as a period of use expires.

Therefore, as shown in FIG. 5, the interposed element 122 may be detachably mounted to the head 120 of the razor handle 100, and replaceable as required by a user. In FIG. 5, the interposed element 122 may be selectively mounted sliding in a slit 121*a* formed in the head 120 and extended in the longitudinal direction. However, such a sliding structure is merely an example of a coupling structure between the head 120 and the interposed element 122, and various coupling structures may be employed additionally.

Figure 6:
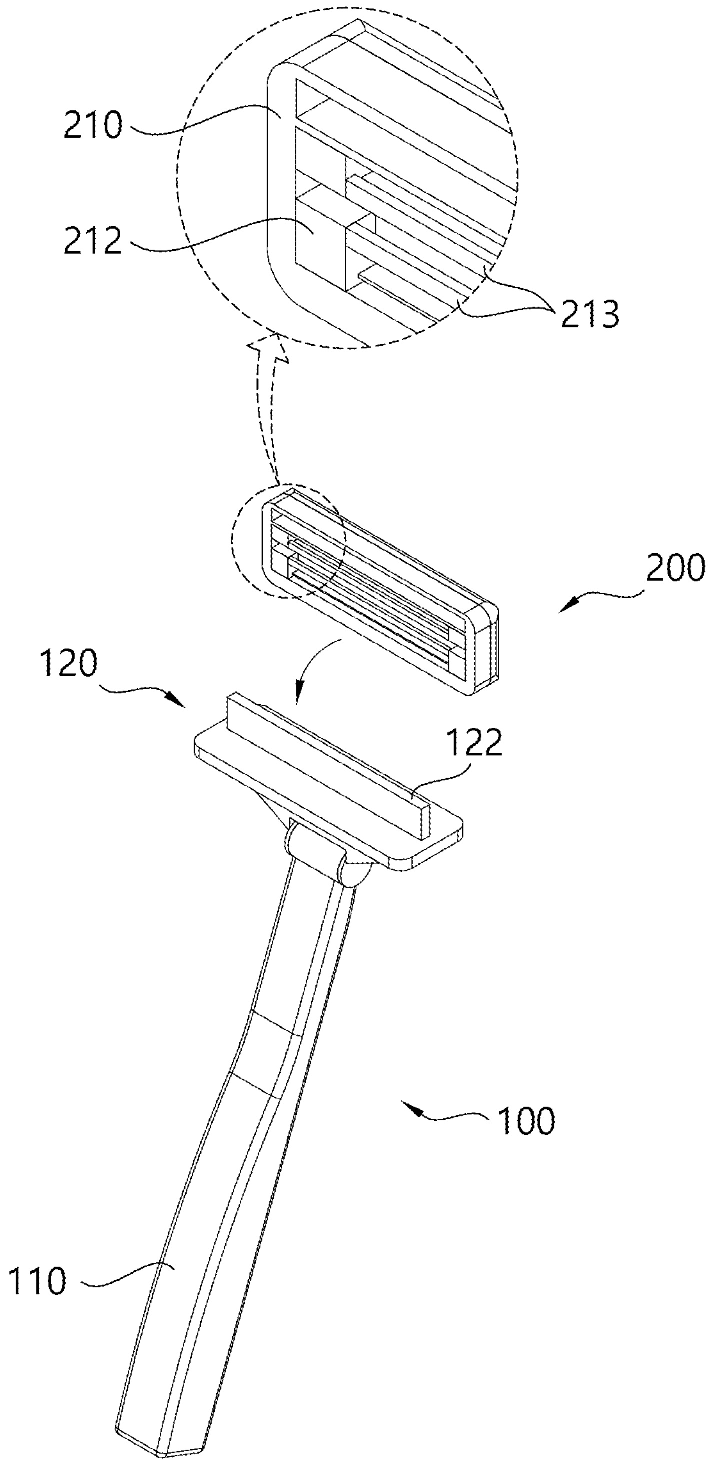
FIG. 6 is a perspective view showing a coupling structure of a razor cartridge according to an embodiment of the disclosure.

FIG. 6 is a perspective view showing a coupling structure of a razor cartridge 200 according to an embodiment of the disclosure. FIGS. 1 to 4 illustrate that the razor cartridge 200 is coupled to the head coupling portion 123 provided in the body of the head 120, but the razor cartridge 200 may be directly coupled to the interposed element 122 as shown in FIG. 6.

For example, as shown in FIG. 6, the cartridge coupling portion 213 may be provided on the bottom of the razor cartridge 200 as a fitting member having a gap corresponding to the transverse width of the interposed element, so that the interposed element 122 can be fitted and mounted to the cartridge coupling portion 213. However, the cartridge coupling portion 213 and the head coupling portion 123 may be embodied by various coupling means as well as the fitting coupling method. Alternatively, the head coupling portion 123 may be provided in the interposed element 122 so that the razor cartridge 200 can be directly coupled to the interposed element 122 itself.

Figure 7:
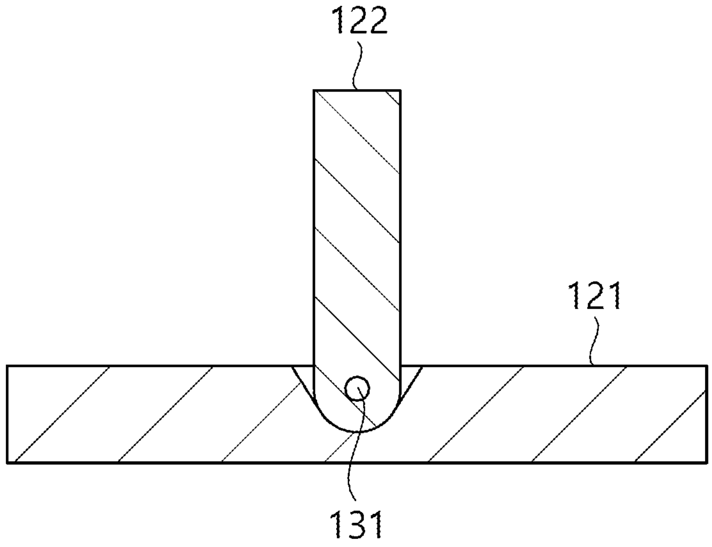
FIG. 7 is a cross-sectional view showing a pivotable structure of a razor handle according to an embodiment of the disclosure.

FIG. 7 is a cross-sectional view showing a pivotable structure of a razor handle 100 according to an embodiment of the disclosure. In FIGS. 1 to 4, the interposed element 122 and the head 120 are provided to operate as a single body, and therefore the interposed element 122 is also pivoted integrally with the head 120 when the head 120 pivots with respect to the grip 110. On the other hand, as shown in FIG. 7, the interposed element 122 may be pivotable with respect to the body portion 121 of the head 120.

For example, one end of the interposed element 122 may be hinged to the body portion 121 of the head 120, and the interposed element 122 may be pivotable with respect to the body portion 121 of the head 120 by using a hinge connector as the pivoting shaft 131. In this case, the razor cartridge 200 is provided to be pivotable integrally with the interposed element 122, and therefore more dynamically operates during shaving because the distance between the shaving plane and the pivoting shaft is shorter than that of the embodiment shown in FIGS. 1 to 4.

Further, the head 120 of FIG. 7 has a structure where the body portion 121 and the interposed element 122 are separately provided. However, alternatively, the head 120 may be provided as the interposed element 122 itself without the separate body portion 121 and thus pivotable at one end of the grip 110, and the razor cartridge 200 may be directly coupled to the interposed element 122.

Meanwhile, FIGS. 1 to 4 illustrate that the interposed element 122 is exposed to the shaving plane of the razor cartridge 200, and forms the noncutting area by which the first area a and the second area b are separated, thereby coming into contact with skin and stretching the skin. However, the interposed element 122 may be modified to come into contact with skin between the cutting areas of the shaving plane and implement various functions without limitations.

Figure 8:
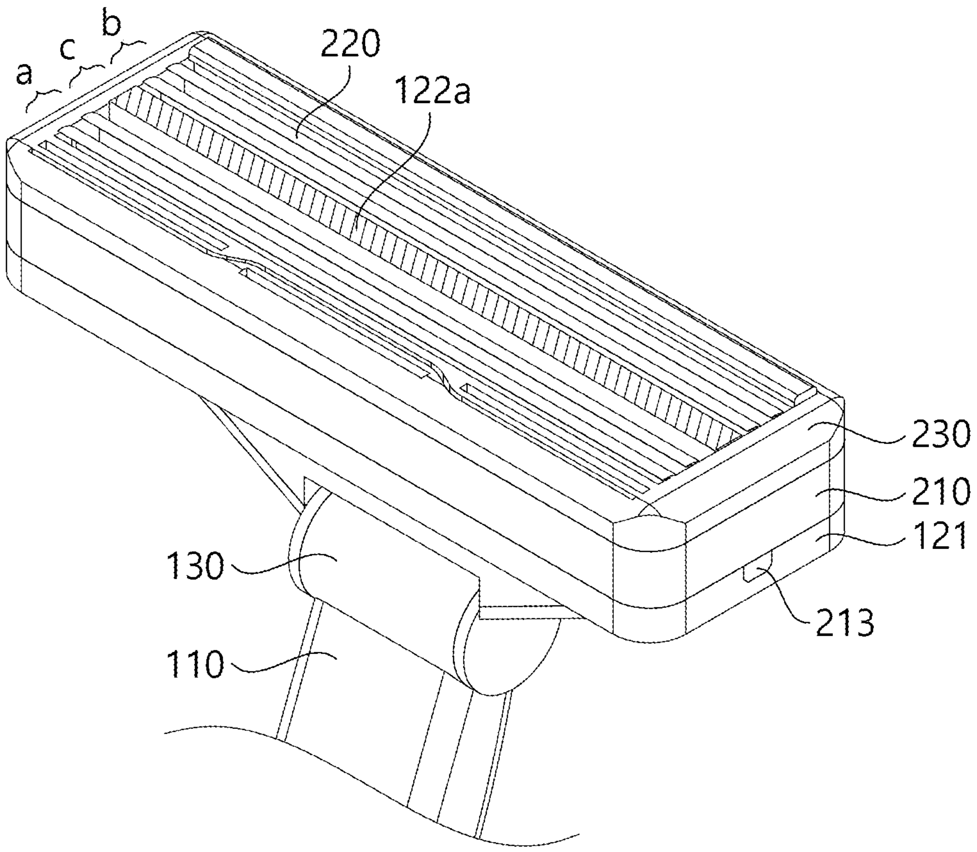
FIG. 8 is a perspective view showing a skin contact portion of an interposed element according to an embodiment of the disclosure.

FIG. 8 is a perspective view showing a skin contact portion 122*a* of an interposed element according to an embodiment of the disclosure. For example, the skin contact portion 122*a* of the interposed element may form an area to which a lubrication material is applied. Thus, it is possible to have a moisturizing effect on the skin surface during shaving or improve the operation characteristics of the blade 220. Further, the skin contact portion 122*a* of the interposed element 122 may be shaped like a comb having a concave and convex pattern along the longitudinal direction. In this case, uniform shaving is possible because body hair is made neat during the shaving.

Figure 9:
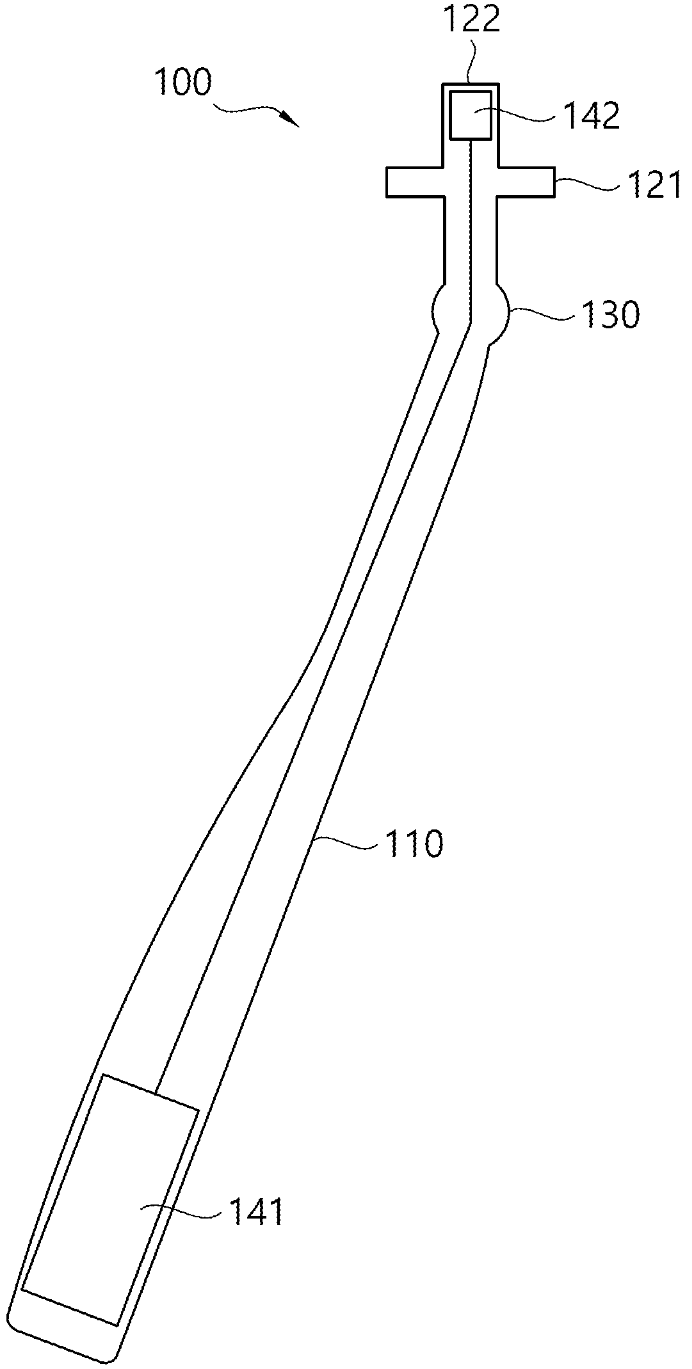
FIG. 9 is a view schematically illustrating an internal structure of a razor assembly according to an embodiment of the disclosure.
Figure 10:
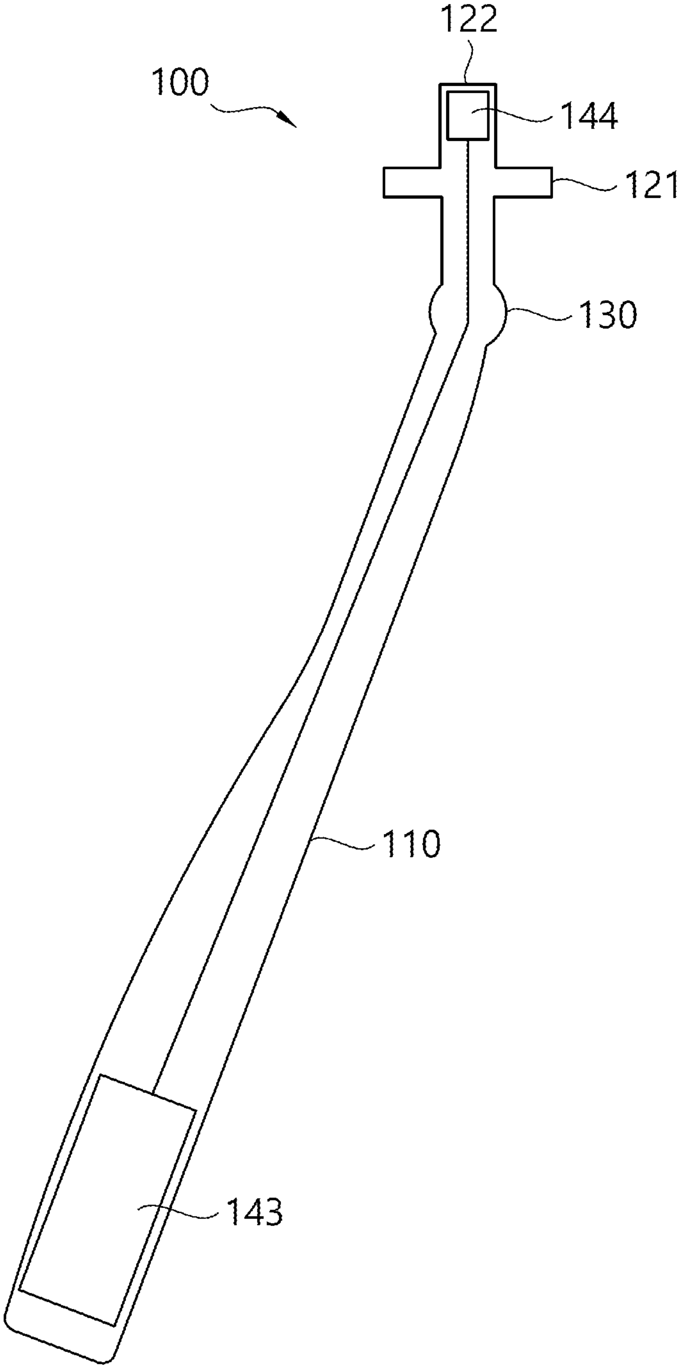
FIG. 10 is a view schematically illustrating an internal structure of a razor assembly according to an embodiment of the disclosure.

FIGS. 9 and 10 are views schematically illustrating an internal structure of a razor assembly 10 according to an embodiment of the disclosure. In this embodiments, the interposed element 122, which is exposed to the shaving plane of the razor cartridge 200 and comes into contact with skin as described above, is provided in not the razor cartridge 200 but the razor handle 100. Therefore, the interposed element 122 can perform various additional functions based on a relatively bulky and semi-permanently usable razor handle structure as compared with the size-limited and consumable razer cartridge 200.

For example, the razor handle 100 shown in FIG. 9 includes a battery 141 provided inside the grip 110, and an electric element 142 provided inside the interposed element 122. The electric element 142 may employ elements to implement various functions, and may selectively operate as electrically connected to the battery 141.

For example, the electric element 142 may be provided as a heater to heat the skin contact portion 122*a* of the interposed element 122. Thus, it is possible to give a user a good feeling of use during contact with skin, or control the temperature of skin or body hair to improve the shaving performance and prevent skin damage.

Alternatively, the electric element 142 may be provided as a motor or the like vibration element, and make the skin contact portion 122*a* of the interposed element 122 vibrate. Thus, it is possible to have a massage effect on the surface of skin during shaving.

Alternatively, the razor handle 100 shown in FIG. 10 may include a shaving aid storage 143 provided inside the grip 110, and a shaving aid supplier 144 formed inside the interposed element 122. The shaving aid refers to an agent for protecting skin or improving shaving performance, and may be given in various forms such as foam, gel, liquid, powder, etc., and the shaving aid stored in the storage 143 may be provided to the supplier 144 through a channel connected along the razor handle 100. Therefore, the shaving aid is supplied to the shaving plane during shaving through the shaving aid supplier 144 provided in the interposed element 122, thereby proving an improved shaving environment.

Although various embodiments have been described above with reference to FIGS. 5 to 10, the disclosure is not limited to these embodiments, and various changes can be made in the razor assembly, the razor handle, and the razor cartridge, in which the cutting areas of the shaving plane are spaces apart from each other by the interposed element provided in the razor handle, without limitations.

Further, the embodiments shown in FIGS. 5 and 10 are not construed as only independent embodiments, but may be modified based on the embodiments shown in FIGS. 1 to 4 or by combining the features described in the respective embodiments.

According to the disclosure, the shaving plane, of which the cutting areas are separated and partitioned by the interposed element, is provided, thereby having advantages of improving the shaving performance in various shaving environments, giving a user a good feeding of use, and enabling safe shaving.

Further, the interposed element is provided in such a way of being inserted in the opening of the razor cartridge, thereby having advantages of simplifying the structure of the consumable cartridge and reducing production costs.

In addition, the interposed element exposed to the shaving plane is provided in the razor handle, thereby having advantages of implementing various additional functions through the interposed element in the body space of the handle.

Although few embodiments of the disclosure have been described above in detail, the disclosure is not limited to these embodiments. It will be appreciated that various changes or modifications can be made in the disclosure by a person having ordinary knowledge in the art, to which the disclosure pertains, without departing from the scope of the disclosure of which technical features are defined in the appended claims.

What is claimed is:

1. A razor assembly comprising:

a razor cartridge comprising:

a plurality of blades, each comprising a cutting edge, a blade housing accommodating the plurality of blades in a longitudinal direction, the plurality of blades comprising at least one first blade arranged in a first area of the blade housing and at least one second blade arranged in a second area of the blade housing, the second area spaced apart from the first area, and the blade housing comprising an opening interposed between the first area and the second area; and a handle comprising:

a head, an interposed element extending from a first side of the head in a third direction, and a grip extending from a second side of the head, the handle configured to be detachably coupled to the razor cartridge, wherein the opening is configured to allow the interposed element to be inserted from a bottom of the blade housing such that in a coupled state in which the handle is coupled to the razor cartridge, the interposed element is accommodated in the opening of the razor cartridge, wherein the opening comprises a first opening surface and a second opening surface that are arranged in a transverse direction perpendicular to the longitudinal direction, wherein the opening has a transverse width between the first opening surface and the second opening surface, the transverse width of the opening being greater than that of the interposed element such that a first gap is formed between the first opening surface and a front edge portion of the interposed element, and a second gap is formed between the second opening surface and a rear edge portion of the interposed element opposing the front edge portion, and wherein the first gap does not overlap any portion of the at least one first blade in the third direction perpendicular to both the longitudinal direction and the transverse direction, and at least a portion of the second gap does not overlap any portion of the at least one second blade in the third direction.

2. The razor assembly of claim 1, wherein the plurality of blades are discontinuously arranged by the interposed element inside the blade housing.

3. The razor assembly of claim 1, wherein the interposed element comprises a flat top surface having a height that is equal to a height of the cutting edges of the plurality of blades.

4. The razor assembly of claim 1, wherein the interposed element comprises a skin contact portion that is formed as a noncutting area.

5. The razor assembly of claim 1, wherein the interposed element is detachably coupled to the head.

6. The razor assembly of claim 1, wherein the at least one first blade comprises a forward blade adjacent to the interposed element, and the at least one second blade comprises a backward blade adjacent to the interposed element, wherein the cutting edge of the forward blade is spaced apart from the front edge portion of the interposed element by a front span, and the cutting edge of the backward blade is spaced apart from the rear edge portion of the interposed element by a rear span, and wherein the front span is longer than the rear span.

7. The razor assembly of claim 1, wherein the interposed element comprises a longitudinal length corresponding to one of the plurality of blades or a longitudinal length shorter than the one of the plurality of blades.

8. The razor assembly of claim 1, wherein:

each of the interposed element and the razor cartridge is pivotable around a pivoting shaft with respect to the handle.

9. The razor assembly of claim 1, wherein the head is pivotable with respect to the grip.

10. The razor assembly of claim 1, wherein the razor cartridge is coupled to the interposed element.

11. The razor assembly of claim 1, wherein:

the interposed element further comprises an electrical element configured to operate based on power received from a battery provided in the handle, and the electrical element comprises at least one of a heating element configured to heat the interposed element, or a vibration element configured to vibrate the interposed element.

12. The razor assembly of claim 1, wherein the interposed element comprises a top edge configured to receive a lubrication band.

13. The razor assembly of claim 1, wherein the interposed element comprises a shaving aid supplier at one side thereof to supply a shaving aid from a shaving aid storage provided inside the handle to a shaving plane of the razor cartridge.

14. The razor assembly of claim 1, wherein the interposed element has a rectangular shape in a section when viewed in the longitudinal direction.

15. The razor assembly of claim 1, wherein the interposed element is exposed to a shaving plane of the razor cartridge in the coupled state.

16. The razor assembly of claim 1, wherein:

the grip comprises a battery configured to store electric energy, and the interposed element comprises an electrical element configured to operate based on power received from the battery, and the electrical element comprises at least one of a heating element configured to heat the interposed element, or a vibration element configured to vibrate the interposed element.

17. The razor assembly of claim 1, wherein the handle comprises a first pivot connection between the head and the grip or a second pivot connection between the head and the interposed element.

18. The razor assembly of claim 1, wherein the grip comprises a shaving aid storage, and the interposed element comprises a shaving aid supplier at one side thereof to supply a shaving aid from the shaving aid storage.

* * * * *